E. A. NELSON.
GAS ENGINE.
APPLICATION FILED JAN. 24, 1906.

904,556.

Patented Nov. 24, 1908.

2 SHEETS—SHEET 1.

E. A. NELSON.
GAS ENGINE.
APPLICATION FILED JAN. 24, 1906.

No. 904,556.

Patented Nov. 24, 1908.
2 SHEETS—SHEET 2.

Witnesses
J. G. Stinkel
B. C. Rust

Inventor
Emil A. Nelson
by Foster, Freeman & Watson
Attorneys

UNITED STATES PATENT OFFICE.

EMIL A. NELSON, OF DETROIT, MICHIGAN, ASSIGNOR TO WILLIAM J. NEWTON AND CHARLES
. WOODALL, OF DETROIT, MICHIGAN.

GAS-ENGINE.

No. 904,556.          Specification of Letters Patent.          Patented Nov. 24, 1908.

Application filed January 24, 1906. Serial No. 297,624.

*To all whom it may concern:*

Be it known that I, EMIL A. NELSON, a citizen of the United States, residing at Detroit, in the county of Wayne and State of Michigan, have invented certain new and useful Improvements in Gas-Engines, of which the following is a specification.

This invention relates to gas engines and consists in certain details of construction fully set forth hereinafter and illustrated in the accompanying drawing, in which—

Figure 1:
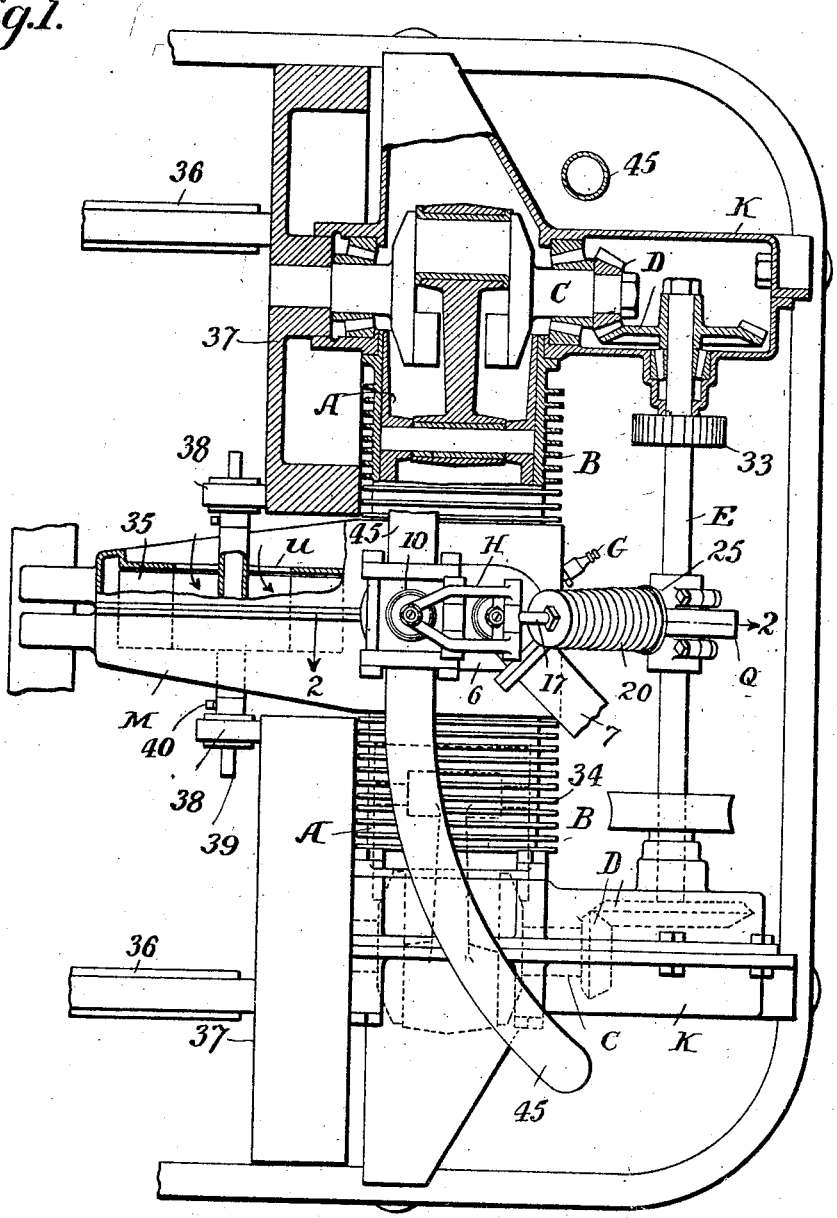
Figure 2:
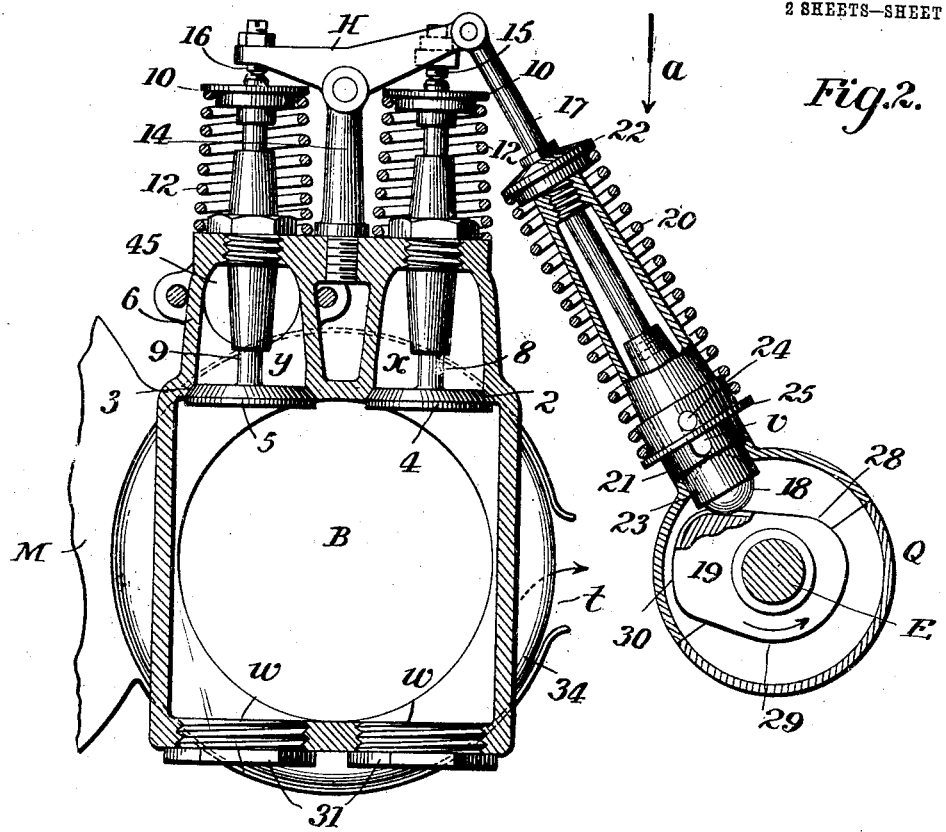
Figure 3:
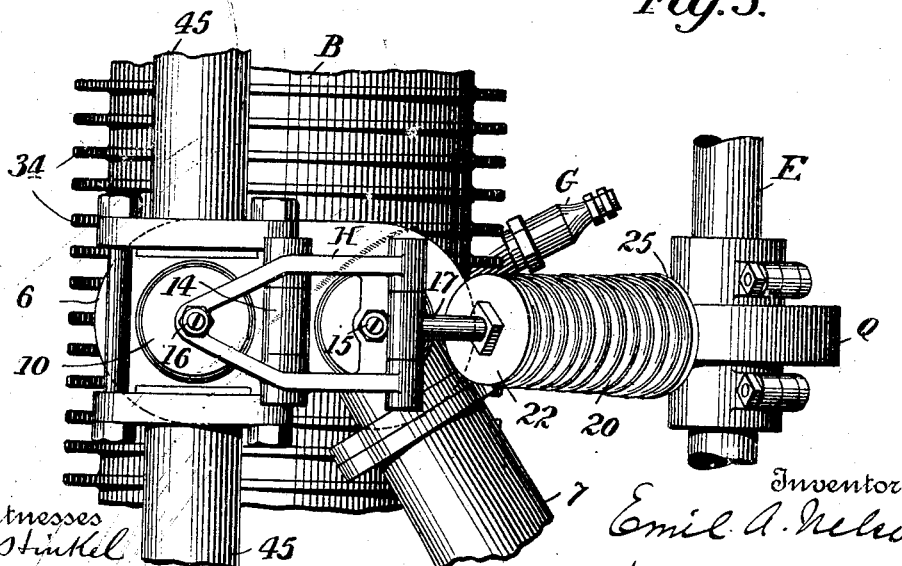

Figure 1 is a plan in part section of a gas engine embodying my improvements; Fig. 2, a transverse section on the line 2—2, Fig. 1; Fig. 3, a plan of Fig. 2.

The multiple piston engine is shown as constructed to receive two pistons A in line with each other and reciprocating to and from each other in a single continuous cylinder B. The two crank shafts C C, parallel to each other, are each geared by bevel gears D with the cam shaft E. A casing K connected with the cylinders and forming practically part thereof, incloses the bevel gears and the crank parts of the shafts, and has bearings for the crank shafts and cam shaft as shown, so as to protect the parts and to constitute an oil chamber for lubricating the cranks, pistons and gears. The shafts may be provided with any suitable bearings, roller bearings being shown. The center of the cylinder B constitutes the explosion chamber when the ignited gases act to carry the pistons simultaneously outward, the ignition being effected by any suitable igniting device, a spark plug G being shown.

While different valve arrangements may be used to control the supply and discharge of gases, according as the engine operates as a two-cycle or four-cycle engine, as shown the engine operates on a four cycle, and there are two ports 2, 3, at the center of the cylinder closed by valves 4, 5, each opening downward. The port 2 is the inlet port, to which the gaseous mixture is supplied in any suitable manner, and the port 3 is the exhaust port and communicates with the exhaust pipes 45. Preferably the cylinder B has at the center a box-like extension 6 which projects to one side and is there divided into two chambers $x$, $y$, the former communicating with the charge inlet pipe 7, and the latter with two side ports, each communicating with a section of the exhaust pipe 45, so that the exhaust can escape freely and in opposite directions avoiding any possible back pressure. At the opposite side of the box 6 are two openings $w$, each threaded to receive a threaded cap 31. This permits the introduction of tools to grind the valve seats, and access to the box to insert and remove the valves.

The valve stems 8, 9 extend through suitable packing boxes and project beyond the wall of the extension 6, and each carries a disk 10 between which and the wall of the extension 6 is compressed a spring 12 which thus tends to hold the valve to its seat. The valves are operated from the cam shaft by suitable devices. As shown, a vibrating rock lever H is pivoted to a bracket 14 and extends across the end of both valve stems, carrying adjustable contact pieces 15, 16, shown as set screws.

To one end of the lever H is jointed a rod 17, the opposite end of which is socketed to receive an anti-friction ball 18 arranged opposite a cam 19 on the cam shaft, the cam having a grooved face adapted to the ball, thus securing a greater bearing surface and reducing wear. Preferably, the ball 18 is in a block 23 having a threaded socket to receive the threaded end of the rod 17 so that by turning the block, the distance between the ball and the end of the lever H may be varied and the block is held from further rotation and is guided by means of a cross pin 24, extending through the block and projecting at the ends into longitudinal slots $v$ of a hollow neck 21 extending from the casing. Upon the neck 21 is a bearing ring 25 between which and a disk 22 on the rod 17 intervenes a spring 20 which tends to hold the ball 18 against the cam and is strong enough to overcome the resistance of the inlet spring 12. When the cam 19 moves from the position, Fig. 2, the rod 17 moves inward, rocks the lever H and opens the inlet valve, supplying a charge to the cylinder. As the point 28 of the cam passes the ball 18, the cam begins to force out the rod 17 and the inlet valve closes and remains closed as the pistons come together and compress the charge. As the pistons reach their outward position, the part 29 of the cam passes the ball 18 and the rod 17 is quickly carried out until the ball rests on the face 30, the lever H being thus rocked to force inward the valve stem 9 and open the exhaust valve and hold it open while the pistons move inward. The control of the gases is thus effected by means of two valves and a single cam.

The cam shaft E may carry at 33ª commutator of any suitable character and may be rotated from a suitable hand crank, not shown, to start the engine. The cylinder has cooling ribs or projections 34 and may be cooled in any suitable manner, an air cooler being shown. A light casing M incloses the cylinder and is also formed to constitute the casing of a rotary blower or fan 35, the casing having side inlets $u$ and a discharge opening $t$, so that the air received by the blower is forcibly directed around the cylinder and outward. The blower is driven from the engine, as for instance, by means of friction fly wheels 37 carried by the crank shafts and driving friction pulleys 38 on the shaft 39 of the blower. The pulleys are adjustably secured to the shaft 39 by set screws 40 so that they can be set inward toward the centers of the wheels 37 when it is desired to reduce the speed of the blower in cold weather. Any other suitable means of varying the speed of the blower may be used.

It will be noted that the air blast is directed to the center of the cylinder B, and as there is but a single explosion point to both parts of the cylinder, the latter can be better cooled than when two cylinders, each with an explosion chamber at one end are used. The power of the engine may be transmitted to the part or parts to be driven from the friction wheels 36, 36, or in any other suitable manner.

Without limiting myself to the construction shown, I claim:—

1. The combination with the cylinder and pistons of a gas engine, of oppositely arranged parallel crank shafts, a shaft E parallel to the cylinder and operatively connected with the crank shafts, inlet and outlet valves, means for actuating said valves from said shaft E, a casing inclosing both the crank shaft and gears at each end of the cylinder and also communicating with the latter, substantially as set forth.

2. In a gas engine having a cylinder, and pistons reciprocating to and from each other therein, a box-like central extension of said cylinder provided with inlet and outlet ports, valves adapted thereto, and valve actuating means, substantially as set forth.

3. In a gas engine having a cylinder, and pistons reciprocating to and from each other therein, a box-like central extension of said cylinder provided with inlet and outlet ports, valves adapted thereto, valve actuating means, and openings in said extension opposite said ports and provided with detachable caps, substantially as set forth.

4. The combination in a gas engine, of a cylinder, inlet and outlet valves, a central box-like extension of the cylinder divided beyond said valves into two chambers, and inlet and outlet ports in the sides of said extension, substantially as set forth.

In testimony whereof I affix my signature in presence of two witnesses.

EMIL A. NELSON.

Witnesses:
BENGT. G. GUSTAFSSON,
EDUARD C. MITCHELL.